(12) United States Patent
Long et al.

(10) Patent No.: US 11,927,476 B2
(45) Date of Patent: Mar. 12, 2024

(54) METHOD, DEVICE, AND DISPLAY DEVICE FOR DETECTING AMBIENT LIGHT WITH A PLURALITY OF AMBIENT LIGHT SENSORS

(71) Applicant: WUHAN CHINA STAR OPTOELECTRONICS TECHNOLOGY CO., LTD., Wuhan (CN)

(72) Inventors: Yaqiong Long, Wuhan (CN); Tengteng Shi, Wuhan (CN); Xiaoyan Niu, Wuhan (CN)

( * ) Notice: Subject to any disclaimer, the term of this patent is extended or adjusted under 35 U.S.C. 154(b) by 135 days.

(21) Appl. No.: 17/600,139

(22) PCT Filed: Aug. 10, 2021

(86) PCT No.: PCT/CN2021/111674
§ 371 (c)(1),
(2) Date: Sep. 30, 2021

(87) PCT Pub. No.: WO2023/000407
PCT Pub. Date: Jan. 26, 2023

(65) Prior Publication Data
US 2023/0031752 A1 Feb. 2, 2023

(30) Foreign Application Priority Data
Jul. 22, 2021 (CN) .......................... 202110829940.1

(51) Int. Cl.
*G09G 3/34* (2006.01)
*G01J 1/42* (2006.01)
*G09G 3/20* (2006.01)

(52) U.S. Cl.
CPC ........... *G01J 1/4204* (2013.01); *G01J 1/4228* (2013.01); *G09G 3/20* (2013.01); *G09G 2360/144* (2013.01); *G09G 2360/16* (2013.01)

(58) Field of Classification Search
None
See application file for complete search history.

(56) References Cited

U.S. PATENT DOCUMENTS

2012/0116632 A1* 5/2012 Bechtel ................ G06V 10/147
701/1
2013/0278147 A1* 10/2013 Vetsuypens .............. G09G 5/10
315/151
(Continued)

FOREIGN PATENT DOCUMENTS

CN WO2019/061530 * 4/2019

OTHER PUBLICATIONS

WO2019/061530 Translation (Year: 2019).*

*Primary Examiner* — Amr A Awad
*Assistant Examiner* — Donna V Bocar

(57) ABSTRACT

A method, device, and display device for detecting ambient light are provided. The method includes obtaining brightness information of the ambient light, determining a brightness interval of the ambient light according to the brightness information of the ambient light and preset correspondences between a plurality of ambient light sensors and different brightness intervals, using the ambient light sensor corresponding to the brightness interval of the ambient light as a reference sensor, and outputting a brightness signal of a current ambient light according to output signals of the ambient light sensors and a preset conversion formula.

18 Claims, 4 Drawing Sheets

(56) References Cited

U.S. PATENT DOCUMENTS

2014/0267202 A1\* 9/2014 Zheng .................... G09G 5/10
 345/207
2018/0182798 A1\* 6/2018 Tack ................ H01L 27/14623
2023/0143803 A1\* 5/2023 Lee .......................... G09G 3/20
 345/690

\* cited by examiner

METHOD, DEVICE, AND DISPLAY DEVICE FOR DETECTING AMBIENT LIGHT WITH A PLURALITY OF AMBIENT LIGHT SENSORS

FIELD OF INVENTION

The present disclosure relates to the technical field of display, and particularly to a method, device, and display device for detecting ambient light.

BACKGROUND

With the gradual development of full-screen technology and 5G technology, it has become an inevitable trend to integrate various sensors such as fingerprint sensors, distance sensors, and ambient light sensors inside screens. The ambient light sensors integrated inside the screens have a problem of low detection accuracy.

SUMMARY OF DISCLOSURE

The present disclosure provides a method, device, and display device for detecting ambient light to solve a current problem of low detection accuracy of ambient light sensors integrated inside screens.

In a first aspect, the present disclosure provides a method for detecting ambient light comprising:

S1: obtaining brightness information of the ambient light;
S2: determining a brightness interval of the ambient light according to the brightness information of the ambient light and preset correspondences between a plurality of ambient light sensors and different brightness intervals; and
S3: using the ambient light sensor corresponding to the brightness interval of the ambient light as a reference sensor, and outputting a brightness signal of a current ambient light according to output signals of the ambient light sensors and a preset conversion formula;

wherein sizes of photosensitive areas of the ambient light sensors are inversely proportional to values of the corresponding brightness intervals.

In some embodiments, in step S3, the preset conversion formula is:

$$S = \frac{\sum_{i=1}^{n}(S_i \times k_i)}{n}.$$

S is the output brightness signal of the current ambient light, n is a number of the ambient light sensors, $k_i$ is a gain coefficient of an i-th ambient light sensor, and $S_i$ is an output signal of the i-th ambient light sensor.

In some embodiments, gain coefficients of the ambient light sensors satisfy the following condition:

$$k_i = \mu(M_s/M_i)$$

$k_i$ is the gain coefficient of the i-th ambient light sensor, u is a constant coefficient, $M_i$ is a photosensitive area of the i-th ambient light sensor, and $M_s$ is a photosensitive area of the reference sensor.

In some embodiments, μ is 1.

In some embodiments, the step S1 of obtaining the brightness information of the ambient light comprises:

determining the ambient light sensor with the smallest photosensitive area among the ambient light sensors; and controlling the ambient light sensor with the smallest photosensitive area to obtain the brightness information of the ambient light.

In some embodiments, the photosensitive areas of the ambient light sensors are different.

In some embodiments, the photosensitive areas of some of the ambient light sensors are same, the ambient light sensors with the same photosensitive area constitute an advanced ambient light sensor, an average value of the output signals of the ambient light sensors with the same photosensitive area is an output signal of the corresponding advanced ambient light sensor, and the advanced ambient light sensor follows the preset conversion formula.

In a second aspect, the present disclosure provides a device for detecting ambient light comprising:

a controller; and
a plurality of ambient light sensors each electrically connected to the controller and configured to obtain brightness information of the ambient light and send the brightness information of the ambient light to the controller;

wherein the controller is configured to determine a brightness interval of the ambient light according to the received brightness information of the ambient light and preset correspondences between the ambient light sensors and different brightness intervals, use the ambient light sensor corresponding to the brightness interval of the ambient light as a reference sensor, and output a brightness signal of a current ambient light according to output signals of the ambient light sensors and a preset conversion formula; and wherein sizes of photosensitive areas of the ambient light sensors are inversely proportional to values of the corresponding brightness intervals.

In some embodiments, each of the ambient light sensors comprises a photosensitive element, and the ambient light sensors are further configured to detect a brightness of the ambient light and output it in a form of a signal as the brightness information of the ambient light.

In some embodiments, the preset conversion formula is:

$$S = \frac{\sum_{i=1}^{n}(S_i \times k_i)}{n}.$$

S is the output brightness signal of the current ambient light, n is a number of the ambient light sensors, $k_i$ is a gain coefficient of an i-th ambient light sensor, and $S_i$ is an output signal of the i-th ambient light sensor.

In some embodiments, gain coefficients of the ambient light sensors satisfy the following condition:

$$k_i = \mu(M_s/M_i)$$

$k_i$ is the gain coefficient of the i-th ambient light sensor, μ is a constant coefficient, $M_i$ is a photosensitive area of the i-th ambient light sensor, and $M_s$ is a photosensitive area of the reference sensor.

In some embodiments, μ is 1.

In some embodiments, the controller is further configured to determine the ambient light sensor with the smallest photosensitive area among the ambient light sensors, and control the ambient light sensor with the smallest photosensitive area to obtain the brightness information of the ambient light.

In some embodiments, the photosensitive areas of the ambient light sensors are different.

In some embodiments, the photosensitive areas of some of the ambient light sensors are same, the ambient light sensors with the same photosensitive area constitute an advanced ambient light sensor, an average value of the output signals of the ambient light sensors with the same photosensitive area is an output signal of the corresponding advanced ambient light sensor, and the advanced ambient light sensor follows the preset conversion formula.

In a third aspect, the present disclosure provides a display device comprising the device for detecting the ambient light described in the second aspect.

In some embodiments, each of the ambient light sensors comprises a photosensitive element. The ambient light sensors are further configured to detect a brightness of the ambient light and output it in a form of a signal as the brightness information of the ambient light.

In some embodiments, the display device further comprises a display area and a non-display area. The device for detecting the ambient light is disposed in the non-display area.

In some embodiments, the non-display area is disposed around the display area, and the ambient light sensors are disposed close to different sides of the display area.

In some embodiments, a detection surface of each of the ambient light sensors is shaped as a rectangle, a circle, a trapezoid, or a combination thereof.

The present disclosure provides a method, device, and display device for detecting ambient light. The method comprises obtaining brightness information of the ambient light, determining a brightness interval of the ambient light according to the brightness information of the ambient light and preset correspondences between a plurality of ambient light sensors and different brightness intervals, using the ambient light sensor corresponding to the brightness interval of the ambient light as a reference sensor, and outputting a brightness signal of a current ambient light according to output signals of the ambient light sensors and a preset conversion formula. Sizes of photosensitive areas of the ambient light sensors are inversely proportional to values of the corresponding brightness intervals. In the present disclosure, a plurality of ambient light sensors with different gains are integrated into the device for detecting ambient light, and the different ambient light sensors are flexibly selected for ambient light brightness detection according to actual environment and detection accuracy requirements, thereby improving a detection accuracy.

BRIEF DESCRIPTION OF DRAWINGS

Specific implementation of the present disclosure will be described in detail below in conjunction with accompanying drawings to make technical solutions and beneficial effects of the present disclosure obvious.

DETAILED DESCRIPTION

Technical solutions in embodiments of the present disclosure will be clearly and completely described below in conjunction with accompanying drawings in the embodiments of the present disclosure. It is apparent that the described embodiments are merely a part of the embodiments of the present disclosure and not all embodiments. All other embodiments obtained by those skilled in the art based on the embodiments of the present disclosure without creative labor are within claimed scope of the present disclosure.

With the gradual development of full-screen technology and 5G technology, it has become an inevitable trend to integrate various sensors such as fingerprint sensors, distance sensors, and ambient light sensors inside screens. The ambient light sensors integrated inside the screens have a problem of low detection accuracy. This is because generally only one ambient light sensor is integrated inside a screen. Because a gain of one ambient light sensor is fixed, it is difficult to accurately detect low-brightness ambient light and high-brightness ambient light with only one ambient light sensor, resulting in low detection accuracy. In this regard, the present disclosure provides a method for detecting ambient light to solve the problem of low ambient light detection accuracy. It should be noted that the method for detecting the ambient light is applied to a device for detecting the ambient light, and the device for detecting the ambient light is applied to various display devices. In order to describe the method for detecting the ambient light more clearly, the device for detecting the ambient light is first described.

Figure 1:
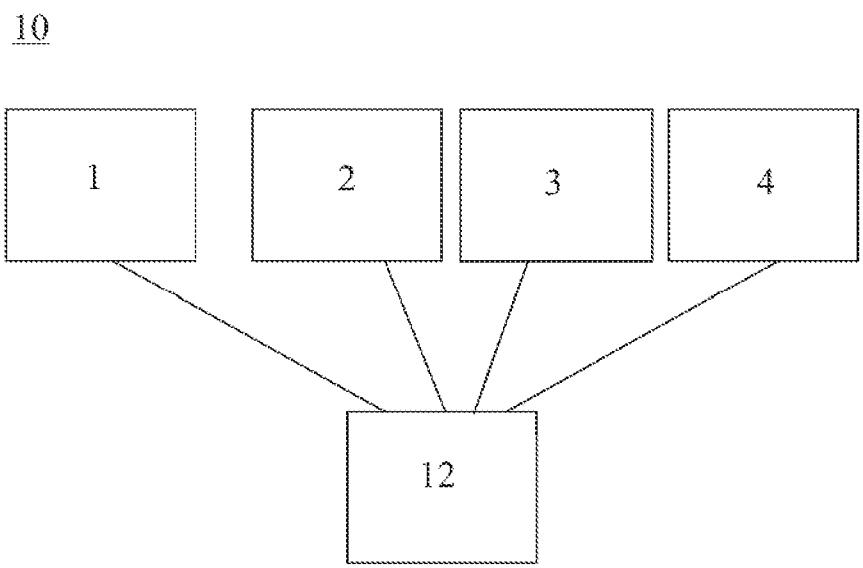
FIG. 1 is a schematic structural diagram of a device for detecting ambient light according to an embodiment of the present disclosure.

FIG. 1 is a schematic structural diagram of a device 10 for detecting ambient light according to an embodiment of the present disclosure. As shown in FIG. 1, the device 10 for detecting the ambient light comprises a controller 12 and a plurality of ambient light sensors 3, and 4 each electrically connected to the controller 12.

The ambient light sensors 1, 2, 3, and 4 are mainly composed of photosensitive elements. The ambient light sensors 1, 2, 3, and 4 are configured to detect a brightness of light in a surrounding environment (i.e. the ambient light) and output it in a form of a signal. Output signals of the ambient light sensors 1, 2, 3, and 4 are brightness information of the ambient light. The controller 12 is a hardware device with functions such as program execution, logic calculation, and instruction output. In the present disclosure; a specific implementation of the controller 12 is not limited.

Figure 2:
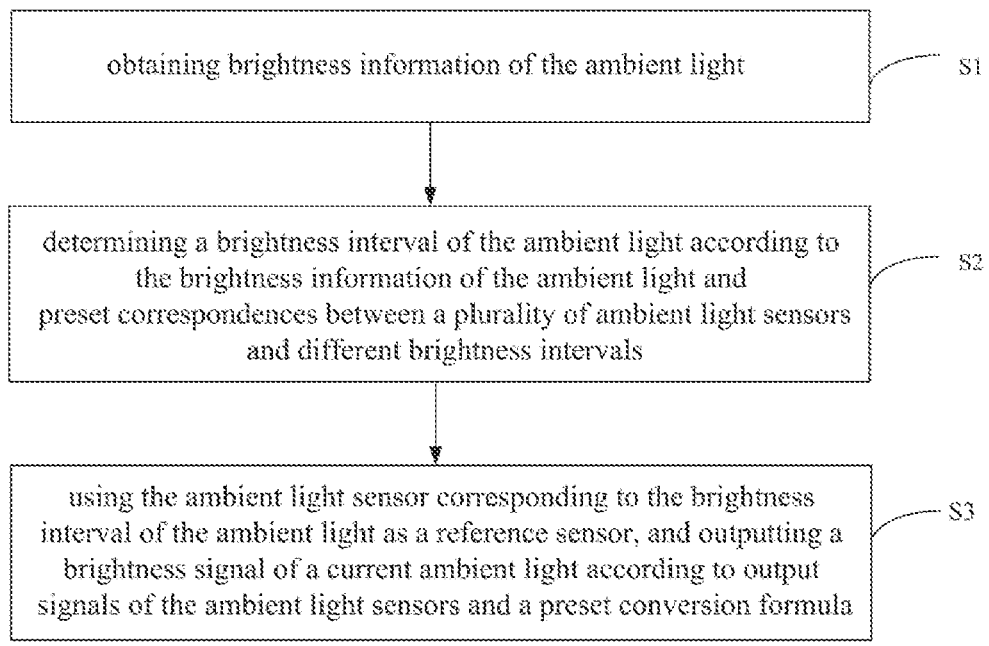
FIG. 2 is a flowchart of a method for detecting the ambient light according to an embodiment of the present disclosure.

The method for detecting the ambient light is described based on the aforementioned device 10 for detecting the ambient light. First, it should be noted that an execution subject of the method for detecting the ambient light is the controller 12. FIG. 2 is a flowchart of a method for detecting the ambient light according to an embodiment of the present disclosure. As shown in FIG. 2, the method for detecting the ambient light comprises the following steps.

S1: obtaining brightness information of the ambient light.

In the step S1, the controller 12 obtains the brightness information of the ambient light. The brightness information obtained by the controller 12 may be brightness information sent to the controller 12 by the ambient light sensors 1, 2, 3, and 4 in the device 10 for detecting the ambient light, or brightness information sent to the controller 12 by a detection element other than the device 10 for detecting the ambient light. In the present disclosure, a manner in which the controller 12 obtains the brightness information is not specifically limited.

S2: determining a brightness interval of the ambient light according to the brightness information of the ambient light and preset correspondences between a plurality of ambient light sensors and different brightness intervals.

In the step S2, the controller 12 determines the brightness interval of the ambient light according to the received brightness information of the ambient light and the preset correspondences between the ambient light sensors 1, 2, 3, and 4 and the different brightness intervals. One brightness interval refers to a brightness range composed of two different brightnesses and other brightnesses between the two brightnesses, and different brightness intervals do not overlap with each other. For example, the ambient light sensor 1 corresponds to a first brightness interval, the ambient light sensor 2 corresponds to a second brightness interval, the ambient light sensor 3 corresponds to a third brightness interval, and the ambient light sensor 4 corresponds to a fourth brightness interval.

The first brightness interval, the second, brightness interval, the third brightness interval, and the fourth brightness interval do not overlap with each other. The controller 12 compares the brightness information of the ambient light with the above four brightness intervals, and takes the brightness interval into which a brightness corresponding to the brightness information of the ambient light falls as the brightness interval of the ambient light.

It should be noted that a number of the brightness intervals is not limited herein. The number of the brightness intervals may be se according to a total range of the brightness of the ambient light and a number of the ambient light sensors. For example, when the total range of the brightness of the ambient light is greater, more brightness intervals may be set. When the number of the ambient light sensors is greater, more brightness intervals may also be set. Furthermore, the number of the brightness intervals may be same as the number of the ambient light sensors.

S3: using the ambient light sensor corresponding to the brightness interval of the ambient light as a reference sensor, and outputting a brightness signal of a current ambient light according to output signals of the ambient light sensors and a preset conversion formula.

In the step S3, the controller 12 use the ambient light sensor corresponding to the brightness interval of the ambient light as the reference sensor, and output the brightness signal of the current ambient light according to the output signals of the ambient light sensors and the preset conversion formula. It should be noted that the brightness signal of the current ambient light may be output by the controller 12, which is more accurate than the output signals (i.e. the brightness information) of the ambient light sensors 1, 2, 3, and 4. For example, if the reference sensor is the ambient light sensor 1, the controller 12 may output the brightness signal of the current ambient light only according to the output signal of the ambient light sensor 1 and the preset conversion formula. The controller 12 may also output the brightness signal of the current ambient light according to the output signals of the ambient light sensor 1 and some or all of the ambient light sensors 2, 3, and 4 and the preset conversion formula.

Sizes of photosensitive areas of the ambient light sensors may be inversely proportional to values of the corresponding brightness intervals. Specifically, the photosensitive areas of the ambient light sensors may be different. That is, the ambient light sensors may correspond to different brightness intervals. That is, each of the brightness intervals may be provided with one corresponding ambient light sensor to reduce a number of the ambient light sensors. Some of the ambient light sensors may have a same photosensitive area. That is, some of the ambient light sensors may correspond to a same brightness interval. That is, each of the brightness intervals may be provided with at least two corresponding ambient light sensors. Furthermore, the at least two corresponding ambient light sensors may constitute an advanced ambient light sensor. An average value of the output signals of the at least two corresponding ambient light sensors is calculated as an output signal of the advanced ambient light sensor. The advanced ambient light sensor also follows the preset conversion formula. This can improve accuracy of ambient light detection.

Specifically, the photosensitive areas of the ambient light sensors may have an approximately linear positive correlation with gains. The greater the photosensitive area of the ambient light sensor, the greater the gain may be. The smaller the photosensitive area of the ambient light sensor, the smaller the gain may be. The Gain refers to a signal amplification rate of the ambient light sensor.

When one ambient light sensor has a constant performance, if the ambient light has a lower brightness (that is, the ambient light has a lower light intensity), a light signal collected by the ambient light sensor is weaker. At this time, one ambient light sensor with a greater gain (i.e. a greater photosensitive area) is needed to detect the ambient light, so that more accurate brightness information of the ambient light can be obtained. If the ambient light has a higher brightness (that is, the ambient light has a higher light intensity), the light signal collected by the ambient light sensor is relatively strong. At this time, if the ambient light sensor with the greater gain (i.e. the greater photosensitive area) is used, the ambient light sensor cannot detect the ambient light with the higher brightness due to overexposure. Therefore, one ambient light sensor with a smaller gain (i.e. a smaller photosensitive area) is used to detect the ambient light, so that more accurate brightness information of the ambient light can be obtained.

That is, the greater the photosensitive area of the ambient light sensor, the more accurately the ambient light sensor can detect the ambient light with the lower brightness. That is, brightness information of the ambient light with the lower brightness obtained by the ambient light sensor is more accurate. The smaller the photosensitive area of the ambient light sensor is, the more accurately the ambient light sensor can detect the ambient light with the higher brightness. That is, brightness information of the ambient light with the higher brightness obtained by the ambient light sensor is more accurate.

The size of the photosensitive area of the ambient light sensor may be inversely-proportional to the value of the corresponding brightness interval. That is, the greater the photosensitive area of the ambient light sensor, the smaller the brightness interval of the ambient light sensor. The smaller the photosensitive area of the ambient light sensor, the greater the brightness interval of the ambient light sensor. It should be noted that the brightness interval of the ambient light sensor may be understood as a brightness interval optimally detected by the ambient light sensor. Because the ambient light sensor with the greater photosensitive area can more accurately detect the ambient light with the lower brightness, the brightness interval of the ambient light sensor is smaller. Because the ambient light sensor with the smaller photosensitive area can more accurately detect the ambient light with the higher brightness, the brightness interval of the ambient light sensor is greater.

It is understood that a device for detecting ambient light in the prior art generally only comprises a controller and an ambient light sensor. Because a gain of the ambient light sensor is fixed, the ambient light sensor may be difficult to accurately detect low-brightness ambient light and high-brightness ambient light. In this regard, in the present disclosure, a plurality of ambient light sensors with different gains are integrated into the device for detecting ambient light, and the different ambient light sensors are flexibly selected for ambient light brightness detection according to actual environment and detection accuracy requirements, thereby improving a detection accuracy.

Based on any of the above embodiments, in step S3, the preset conversion formula may be:

$$S = \frac{\sum_{i=1}^{n}(S_i \times k_i)}{n}.$$

S is the output brightness signal of the current ambient light, n is a number of the ambient light sensors, $k_i$ is a gain coefficient of an i-th ambient light sensor, and $S_i$ is an output signal of the i-th ambient light sensor.

Based on any of the above embodiments, gain coefficients of the ambient light sensors satisfy the following condition:

$k_i=\mu(M_s/M_i)$ $k_i$ is the gain coefficient of the i-th ambient light sensor, μ is a constant coefficient, $M_i$ is a photosensitive area of the i-th ambient light sensor, and $M_s$ is a photosensitive area of the reference sensor. It should be noted that the constant coefficient μ may be selected according to actual conditions such as a model and signal size of the ambient light sensor, which is not specifically limited in this disclosure. Furthermore, circuits corresponding to ambient light sensors with different photosensitive areas may be different. That is, corresponding compensation signals or capacitances may be different. Therefore, the constant coefficients μ corresponding to the ambient light sensors with the different photosensitive areas may be different. It should be noted that, for convenience of description and calculation of the gain coefficients of the ambient light sensors with the different photosensitive areas, it is temporarily considered that the constant coefficients μ corresponding to the ambient light sensors with different photosensitive areas may be same.

For example, a photosensitive area, gain, and brightness interval of each of the above four ambient light sensors 1, 2, 3, and 4 may be as shown in Table 1.

TABLE 1

Parameter table of ambient light sensors

| Number of ambient light sensors | Brightness interval | Gain | Photosensitive area |
|---|---|---|---|
| Ambient light sensor 1 | 0-10 lux | ×64 | 10000 μm² |
| Ambient light sensor 2 | 10-100 lux | ×16 | 2500 μm² |
| Ambient light sensor 3 | 100-1000 lux | ×4 | 625 μm² |
| Ambient light sensor 4 | 1000-10k lux | ×1 | 156 μm² |

If the brightness corresponding to the brightness information of the ambient light obtained by the controller 12 in step S1 is 5 lux, the ambient light sensor 1 corresponding to the brightness interval 0-10 lux into which 5 lux falls is used as the reference sensor. If the brightness corresponding to the brightness information of the ambient light obtained by the controller 12 in step S1 is 50 lux, the ambient light sensor 2 corresponding to the brightness interval 10-100 lux into which 50 lux falls is used as the reference sensor. If the brightness corresponding to the brightness information of the ambient light obtained by the controller 12 in step S1 is 500 lux, the ambient light sensor 3 corresponding to the brightness interval 100-1000 lux into which 500 lux falls is used as the reference sensor. If the brightness corresponding to the brightness information of the ambient light obtained by the controller 12 in step S1 is 5000 lux, the ambient light sensor 4 corresponding to the brightness interval 1000-10 lux into which 5 lux falls is used as the reference sensor.

It should be noted that when there are the aforementioned advanced ambient light sensors, each of the advanced ambient light sensors may be regarded as the i-th ambient light sensor for calculation. Specifically, for example, a device for detecting ambient light comprises a first ambient light sensor, a second ambient light sensor, a third ambient light sensor . . . , and an m-th ambient light sensor these m ambient light sensors. If the second ambient light sensor and the third ambient light sensor have a same photosensitive area, the first ambient light sensor may be used as a $1^{st}$ ambient light sensor, an advanced ambient light sensor corresponding to the second ambient light sensor and the third ambient light sensor may be used as a $2^{nd}$ ambient light sensor, and a fourth ambient light sensor to the m-th ambient light sensor may be sequentially used as a $3^{rd}$ ambient light sensor to a (m-1)-th ambient light sensor, so as to participate in calculation of the preset conversion formula and the gain coefficient. Similarly, when two or more brightness intervals are each provided with two or more corresponding ambient light sensors, serial numbers of the ambient light sensors may be re-determined and then participate in the calculation of the preset conversion formula and the gain coefficient.

In the case of μ=1, if the reference sensor is the ambient light sensor 1, and only the ambient light sensor 1 participates in calculating the brightness signal of the current ambient light, the output signal of the ambient light sensor 1 is directly used as the brightness signal of the current ambient light.

In the case of μ=1, if the reference sensor is the ambient light sensor 1, and the ambient light sensor 1, the ambient light sensor 2, the ambient light sensor 3, and the ambient light sensor 4 participate in calculating the brightness signal of the current ambient light, a specific formula for calculating the brightness signal of the current ambient light is:

$$S = \frac{S_1 + S_2 \times 4 + S_3 \times 16 + S_4 \times 64}{4}.$$

In the case of μ=1, if the reference sensor is the ambient light sensor 2, and the ambient light sensor 1, the ambient light sensor 2, the ambient light sensor 3, and the ambient light sensor 4 participate in calculating the brightness signal of the current ambient light, a specific formula for calculating the brightness signal of the current ambient light is:

$$S = \frac{S_1/4 + S_2 + S_3 \times 4 + S_4 \times 16}{4}$$

In the case of μ=1, if the reference sensor is the ambient light sensor 3, and the ambient light sensor 1, the ambient light sensor 2, the ambient light sensor 3, and the ambient light sensor 4 participate in calculating the brightness signal of the current ambient light, a specific formula for calculating the brightness signal of the current ambient light is:

$$S = \frac{S_1/16 + S_2/4 + S_3 + S_4 \times 4}{4}$$

In the case of μ=1, if the reference sensor is the ambient light sensor 4, and the ambient light sensor 1, the ambient light sensor 2, the ambient light sensor 3, and the ambient light sensor 4 participate in calculating the brightness signal of the current ambient light, a specific formula for calculating the brightness signal of the current ambient light is:

$$S = \frac{S_1/64 + S_2/16 + S_3/4 + S_4}{4}$$

Based on any of the above embodiments, the step S1 of obtaining the brightness information of the ambient light may comprise, but is not limited to, the following steps.

S11: determining the ambient light sensor with the smallest photosensitive area among the ambient light sensors.

S12: controlling the ambient light sensor with the smallest photosensitive area to obtain the brightness information of the ambient light.

Specifically, the brightness of the ambient light is not known at the beginning. The ambient light sensor with the smaller photosensitive area (i.e. the smaller gain) has a greater span-range. The ambient light sensor with the greater photosensitive area (i.e. the greater gain), when the brightness of the ambient light is higher, cannot detect the ambient light with the higher brightness due to the overexposure. Therefore, when the brightness of the ambient light is not known in advance, the controller can preferentially control an ambient light sensor with the smallest photosensitive area (i.e. the smallest gain) to obtain the brightness information of the ambient light. This can detect the ambient light in a great range from low brightness to high brightness, thereby obtaining the brightness information of the ambient light.

Based on any of the above embodiments, the present disclosure provides a device for detecting ambient light. FIG. 1 is a schematic structural diagram of a device for detecting ambient light according to an embodiment of the present disclosure. As shown in FIG. 1, the device 10 for detecting the ambient light comprises a controller 12 and a plurality of ambient light sensors 1, 2, 3, and 4 each electrically connected to the controller 12.

The ambient light sensors 1, 2, 3, and 4 are mainly composed of photosensitive elements. The ambient light sensors 1, 2, 3, and 4 are configured to detect a brightness of light in a surrounding environment (i.e. the ambient light) and output it in a form of a signal, Output signals of the ambient light sensors 1, 2, 3, and 4, are brightness information of the ambient light. The controller 12 is a hardware device with functions such as program execution, logic calculation, and instruction output. In the present disclosure, a specific implementation of the controller 12 is not limited.

The ambient light sensors 1, 2, 3, and 4 are configured to obtain brightness information of the ambient light and send the brightness information of the ambient light to the controller 12.

The controller 12 is configured to determine a brightness interval of the ambient light according to the received brightness information of the ambient light and preset correspondences between the ambient light sensors 1, 2, 3, and 4 and different brightness intervals, use the ambient light sensor 1, 2, 3, or 4 corresponding to the brightness interval of the ambient light as a reference sensor, and output a brightness signal of a current ambient light according to output signals of the ambient light sensors 1, 2, 3, and 4 and a preset conversion formula. Sizes of photosensitive areas of the ambient light sensors 1, 2, 3, and 4 are inversely proportional to values of the corresponding brightness intervals.

The device for detecting the ambient light provided by the present disclosure executes the method for detecting the ambient light in the aforementioned embodiments. Because the method for detecting the ambient light is described in the aforementioned embodiments in detail, the device for detecting the ambient light is not be described in detail herein. In the device for detecting the ambient light provided by the present disclosure, a plurality of ambient light sensors with different gains are integrated into the device for detecting ambient light, and the different ambient light sensors are flexibly selected for ambient light brightness detection according to actual environment and detection accuracy requirements, thereby improving a detection accuracy.

Based on any of the above embodiments, the preset conversion formula is:

$$S = \frac{\sum_{k=1}^{n}(S_i \times k_i)}{n}.$$

S is the output brightness signal of the current ambient light, n is a number of the ambient light sensors, $k_i$ is a gain coefficient of an i-th ambient light sensor, and $S_i$ is an output signal of the i-th ambient light sensor.

Based on any of the above embodiments, gain coefficients of the ambient light sensors satisfy the following condition:

$$k_i = \mu(M_s/M_i)$$

$k_i$ is the gain coefficient of the i-th ambient light sensor, μ is a constant coefficient, $M_i$ is a photosensitive area of the i-th ambient light sensor, and $M_s$ is a photosensitive area of the reference sensor.

Based on any of the above embodiments, the controller is further configured to determine the ambient light sensor with the smallest photosensitive area among the ambient light sensors, and control the ambient light sensor with the smallest photosensitive area to obtain the brightness information of the ambient light.

Based on a same inventive concept, the present disclosure further provides a display device. The display device comprises the device for detecting the ambient light in the above embodiments.

The display device provided by the present disclosure integrates the device for detecting the ambient light described in the above embodiments. The device for detecting the ambient light executes the method for detecting the ambient light in the aforementioned embodiments. Because the method for detecting the ambient light is described in the aforementioned embodiments in detail, the device for detecting the ambient light is not be described in detail herein. In the display device provided by the present disclosure, the device for detecting the ambient light comprising a plurality of ambient light sensors with different gains are integrated into the display device, and the different ambient light sensors are flexibly selected fir ambient light brightness detection according to actual environment and detection accuracy requirements, thereby improving a detection accuracy.

Based on any of the above embodiments, the display device of the present disclosure comprises a display area and a non-display area. The device for detecting the ambient light is disposed in the non-display area.

Figure 3:
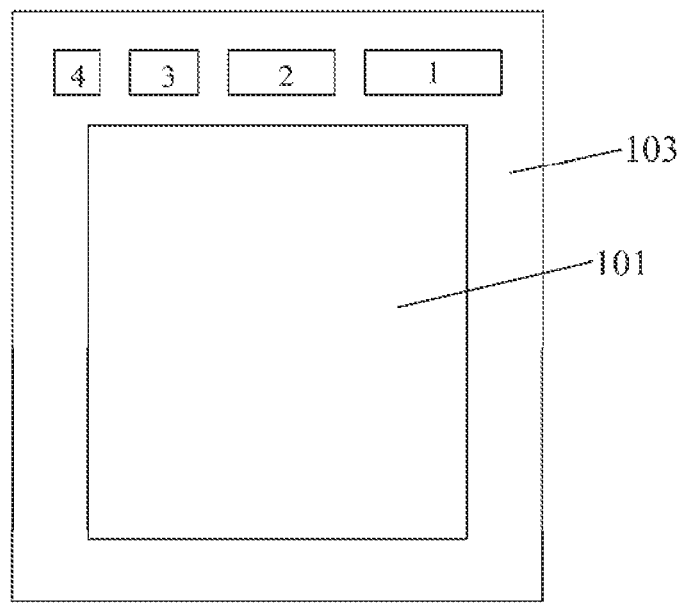
FIG. 3 is a schematic plan view of a display device according to an embodiment of the present disclosure.
Figure 4:
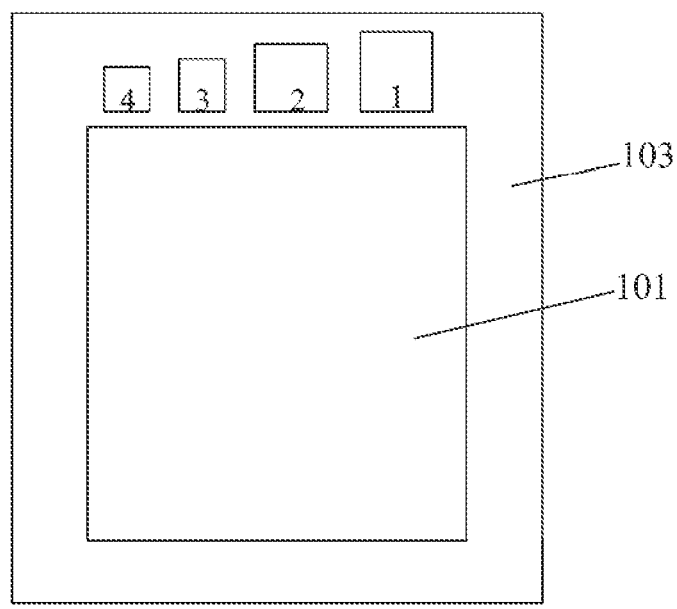
FIG. 4 is the other schematic plan view of the display device according to an embodiment of the present disclosure.

Specifically, FIG. 3 is a schematic plan view of a display device 100 according to an embodiment of the present disclosure, and FIG. 4 is the other schematic plan view of the display device 100 according to an embodiment of the present disclosure. As shown in FIG. 3 and FIG. 4, the display device 100 comprises a display area 101 and a non-display area 103 surrounding the display area 101, and a device for detecting ambient light is disposed in the non-display area 103. FIG. 3 and FIG. 4 only show an ambient light sensor 1, an ambient light sensor 2, an ambient light sensor 3, and an ambient light sensor 4 in the device for detecting the ambient light. It can be understood that because FIG. 3 and FIG. 4 are schematic plan views, FIG. 3 and FIG. 4 cannot illustrate a controller generally integrated inside a display device.

It should be noted that the four ambient light sensors 1, 2, 3, and 4 shown in FIG. 3 and FIG. 4 are all disposed above the display area 101. In other embodiments, the four ambient light sensors 1, 2, 3, and 4 may also be disposed to left, right, or below the display area 101. The four ambient light sensors 1, 2, 3, and 4 may also be disposed above, below, left, and right of the display area 101, respectively. In the present disclosure, positions of the four ambient light sensors 1, 2, 3, and 4 are not specifically limited.

It should be noted that a detection surface of each of the four ambient light sensors 1, 2, 3x and 4 shown in FIG. 3 and FIG. 4 may be shaped as a rectangle. In other embodiments, the detection surface of each of the four ambient light sensors 1, 2, 3, and 4 may also be shaped as a circle, a trapezoid, other shape, or a combination of different shapes. In the present disclosure, shapes of the four ambient light sensors 1, 2, 3, and 4 are not specifically limited.

Finally, it should be noted that the above embodiments are only used to illustrate technical solutions of the present invention, and are not used to limit the present invention. While the present invention has been described in detail with reference to the foregoing embodiments, it should be understood by those skilled in the art that they can modify the technical solutions recited in the foregoing embodiments, or replace some of technical features in the foregoing embodiments with equivalents. These modifications or replacements do not cause essence of corresponding technical solutions to depart from the scope of the technical solutions of the embodiments of the present disclosure.

What is claimed is:

1. A method for detecting ambient light, comprising:
S1: obtaining brightness information of the ambient light;
S2: determining a brightness interval of the ambient light according to the brightness information of the ambient light; and
S3: determining a reference sensor basing on a preset correspondences between a plurality of ambient light sensors and different brightness intervals, and outputting a brightness signal of a current ambient light according to a preset conversion relationship of output signals of the reference sensor to the brightness signal of a current ambient light;
wherein sizes of photosensitive areas of the ambient light sensors are inversely proportional to values of the corresponding brightness intervals,
in step S3, the preset conversion relationship is defined as:

$$S = \frac{\sum_{i=1}^{n}(S_i \times k_i)}{n},$$

S is the output brightness signal of the current ambient light, n is a number of the ambient light sensors, $k_i$ is a gain coefficient of an i-th ambient light sensor, and $S_i$ is an output signal of the i-th ambient light sensor.

2. The method for detecting the ambient light according to claim 1, wherein
gain coefficients of the ambient light sensors satisfy the following condition:

$k_i = \mu(M_s/M_i)$ $k_i$ is the gain coefficient of the i-th ambient light sensor, μ is a constant coefficient, $M_i$ is a photosensitive area of the i-th ambient light sensor, and $M_s$ is a photosensitive area of the reference sensor.

3. The method for detecting the ambient fight according to claim 2, wherein μ is 1.

4. The method for detecting the ambient light according to claim 1, wherein
the step S1 of obtaining the brightness information of the ambient light comprises:
determining the ambient light sensor with the smallest photosensitive area among the ambient light sensors; and
controlling the ambient light sensor with the smallest photosensitive area to obtain the brightness information of the ambient light.

5. The method for detecting the ambient light according to claim 1, wherein
the photosensitive areas of the ambient light sensors are different.

6. The method for detecting the ambient light according to claim 1, wherein
the photosensitive areas of some of the ambient light sensors are same, the ambient light sensors with the same photosensitive area constitute an advanced ambient light sensor, an average value of the output signals of the ambient light sensors with the same photosensitive area is an output signal of the corresponding advanced ambient light sensor, and the advanced ambient light sensor follows the preset conversion formula.

7. The method for detecting the ambient light according to claim 1, wherein the brightness interval refers to a brightness range composed of two different brightnesses and other brightnesses between the two brightnesses, the brightness interval of the ambient light sensor is a brightness interval optimally detected by the ambient light sensor, and different brightness intervals do not overlap with each other.

8. The method for detecting the ambient light according to claim 1, wherein determining a brightness interval of the ambient light according to the brightness information of the ambient light comprises:
comparing the brightness information of the ambient light with a plurality of preset brightness intervals, and taking one of the brightness intervals into which a brightness corresponding to the brightness information of the ambient light falls as the brightness interval of the ambient light.

9. A device for detecting ambient light, comprising:
a controller; and
a plurality of ambient light sensors each electrically connected to the controller and configured to obtain brightness information of the ambient light and send the brightness information of the ambient light to the controller;
wherein the controller is configured to determine a brightness interval of the ambient light according to the received brightness information of the ambient light, determine a reference sensor basing on a preset correspondences between a plurality of ambient light sensors and different brightness intervals, and output a brightness signal of a current ambient light according to a preset conversion relationship of output signals of the reference sensor to the brightness signal of a current ambient light; and wherein sizes of photosensitive areas of the ambient light sensors are inversely proportional to values of the corresponding brightness intervals, in step S3, the preset conversion relationship is defined as:

$$S = \frac{\sum_{i=1}^{n}(S_i \times k_i)}{n},$$

S is the output brightness signal of the current ambient light, n is a number of the ambient light sensors, $k_i$ is a gain coefficient of an i-th ambient light sensor, and $S_i$ is an output signal of the i-th ambient light sensor.

10. The device for detecting the ambient light according to claim 9, wherein
each of the ambient light sensors comprises a photosensitive element, and the ambient light sensors are further configured to detect a brightness of the ambient light and output it in a form of a signal as the brightness information of the ambient light.

11. The device for detecting the ambient light according to claim 9, wherein
gain coefficients of the ambient light sensors satisfy the following condition:

$$k_i = \mu(M_s/M_i)$$

$k_i$ is the gain coefficient of the i-th ambient light sensor, μ is a constant coefficient, $M_i$ is a photosensitive area of the i-th ambient light sensor, and $M_s$ is a photosensitive area of the reference sensor.

12. The device for detecting the ambient light according to claim 11, wherein
μ is 1.

13. The device for detecting the ambient light according to claim 9, wherein
the controller is further configured to determine the ambient light sensor with the smallest photosensitive area among the ambient light sensors, and control the ambient light sensor with the smallest photosensitive area to obtain the brightness information of the ambient light.

14. The device for detecting the ambient light according to claim 9, wherein
the photosensitive areas of the ambient light sensors are different.

15. The device for detecting the ambient light according to claim 9, wherein
the photosensitive areas of some of the ambient light sensors are same, the ambient light sensors with the same photosensitive area constitute an advanced ambient light sensor, an average value of the output signals of the ambient light sensors with the same photosensitive area is an output signal of the corresponding advanced ambient light sensor, and the advanced ambient light sensor follows the preset conversion formula.

16. A display device, comprising
the device for detecting the ambient light according to claim 9.

17. The display device according to claim 16, wherein
each of the ambient light sensors comprises a photosensitive element, and the ambient light sensors are further configured to detect a brightness of the ambient light and output it in a form of a signal as the brightness information of the ambient light.

18. The display device according to claim 16, further comprising
a display area and a non-display area, wherein the device for detecting the ambient light is disposed in the non-display area, the non-display area is disposed around the display area, and the ambient light sensors are disposed close to different sides of the display area, and a detection surface of each of the ambient light sensors is shaped as a rectangle, a circle, a trapezoid, or a combination thereof.

* * * * *